(12) United States Patent
Brown

(10) Patent No.: US 8,544,212 B2
(45) Date of Patent: *Oct. 1, 2013

(54) EXTERNALLY BRACED INFLATABLE STRUCTURES

(75) Inventor: Glen J. Brown, Santa Cruz, CA (US)

(73) Assignee: HDT Expeditionary Systems, Solon, OH (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/405,830

(22) Filed: Feb. 27, 2012

(65) Prior Publication Data

US 2012/0159866 A1    Jun. 28, 2012

Related U.S. Application Data

(63) Continuation-in-part of application No. 12/069,590, filed on Feb. 12, 2008, now Pat. No. 8,141,301.

(51) Int. Cl.
*E04H 15/20* (2006.01)

(52) U.S. Cl.
USPC ............ 52/2.13; 52/2.19; 52/108; 244/159.2; 244/123.11

(58) Field of Classification Search
USPC ............ 52/2.25, 2.26, 2.12, 2.13, 2.17, 2.18, 52/2.19, 2.21, 108; 244/123.11, 158.3, 159.2
See application file for complete search history.

(56) References Cited

U.S. PATENT DOCUMENTS

| | | |
|---|---|---|
| 3,508,270 A | 4/1970 | Cook |
| 4,248,748 A | 2/1981 | McGrath et al. |
| 4,662,130 A | 5/1987 | Miura et al. |
| 5,421,128 A | 6/1995 | Sharpless et al. |
| 5,559,164 A | 9/1996 | Babu et al. |
| 5,677,023 A | 10/1997 | Brown |
| 5,735,083 A | 4/1998 | Brown et al. |
| 6,182,398 B1 | 2/2001 | Head |
| 6,463,699 B1 | 10/2002 | Bailey et al. |
| 6,685,784 B1 | 2/2004 | Jacino et al. |
| 6,735,920 B1 | 5/2004 | Cadogan |
| 8,141,301 B2 * | 3/2012 | Brown ............... 52/2.13 |
| 2001/0054123 A1 | 12/2001 | Henrikson et al. |
| 2004/0194397 A1 | 10/2004 | Brown et al. |

* cited by examiner

*Primary Examiner* — William Gilbert
(74) *Attorney, Agent, or Firm* — Fay Sharpe LLP

(57) ABSTRACT

A reinforced inflatable structure includes an inflatable member having a longitudinal axis. The member includes a bladder and a braided restraint layer mounted to the bladder. A plurality of spaced supports is mounted on the member and extends outwardly therefrom. A plurality of spaced bracing cables are connected at each end to a respective one of the plurality of supports. The cables are oriented generally parallel to the longitudinal axis of the member and are held at a generally fixed distance from the member by the supports. The inflatable member tensions the bracing cables rendering them capable of resisting bending.

20 Claims, 7 Drawing Sheets

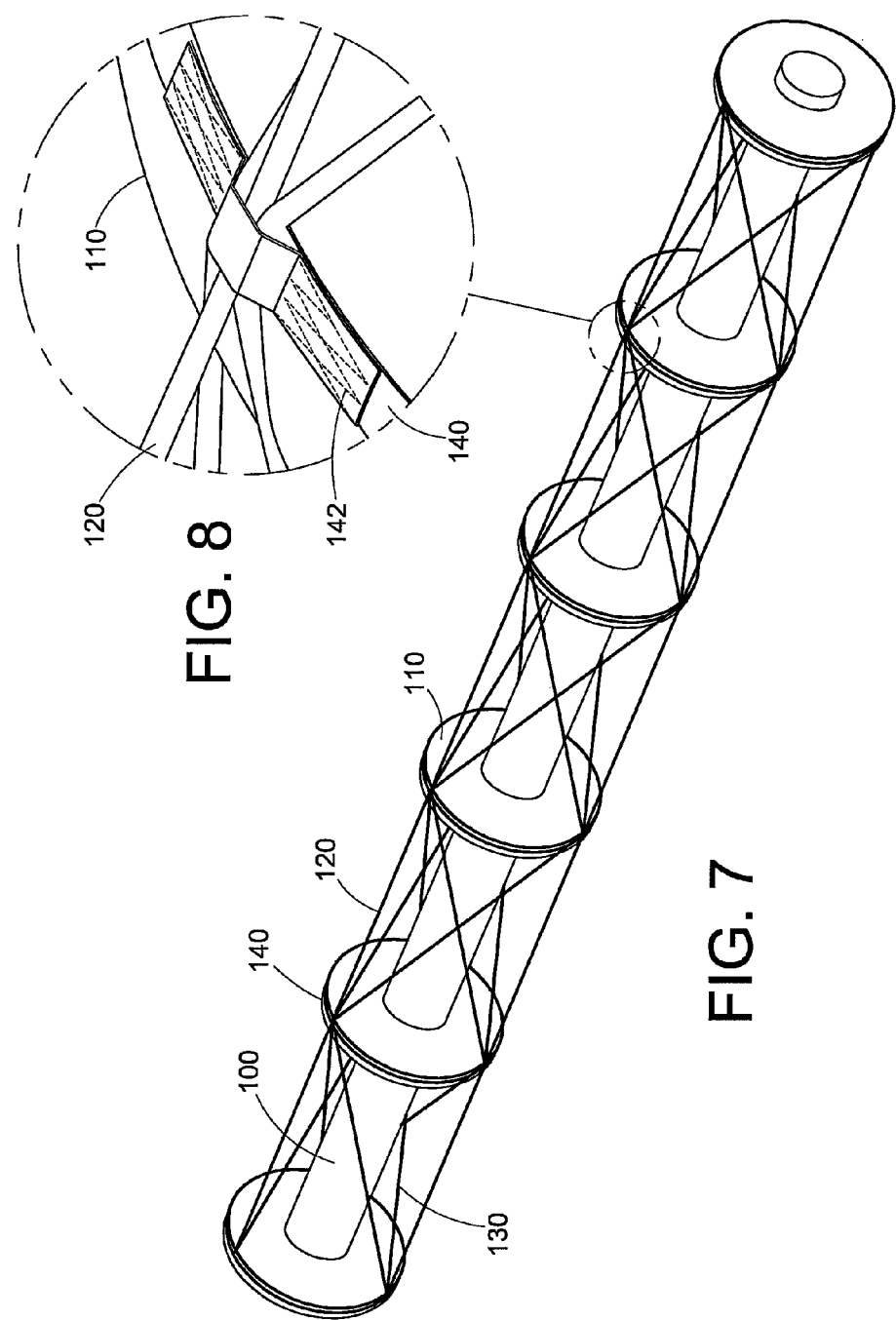

EXTERNALLY BRACED INFLATABLE STRUCTURES

This application is a continuation-in-part of U.S. Ser. No. 12/069,590 which was filed on Feb. 12, 2008 now U.S. Pat. No. 8,141,301.

BACKGROUND

Inflatable structures, sold by assignee under the trademark AIRBEAM are characterized by low mass, low stowed volume for on-site deployment, overload tolerance and tailored strength and stiffness. Current applications use multiple deploy-strike cycles with inflation pressure maintained while in use.

The known inflatable structures are limited in size and load carrying capacity by both manufacturing limitations and by material properties. This disclosure pertains to structures which overcome size limitations and improve the strength and stiffness of very large inflatable structures.

The known inflatable structures are described in U.S. Pat. Nos. 5,421,128 and 5,735,083, the subject matter of which is incorporated hereinto in its entirety. A high bias angle that elongates under pressure provides high bending strength in these structures. This instant disclosure pertains to structures having added external tension elements. These provide an increased moment of inertia for even greater strength and stiffness for a given inflatable structure. The disclosed structure is applicable to, but not limited to, structures for shelters, bridges, deployable wings, and space structures.

SUMMARY OF THE DISCLOSURE

In one embodiment of the present disclosure, a reinforced inflatable structure comprises an inflatable member including a longitudinal axis, the member comprising a bladder and braided restraint layer mounted to the bladder. A plurality of spaced supports is mounted on the member and extends outwardly therefrom. A plurality of spaced bracing cables are connected to a respective one of the plurality of supports. The cables are oriented parallel to the longitudinal axis and held at a generally fixed distance from the member by the supports. The inflatable member tensions the bracing cables rendering them capable of resisting bending.

According to another embodiment of the present disclosure, an externally braced inflatable structure comprises an elongated selectively inflatable member, including a bladder, a braided layer and a longitudinal axis. At least two supports are mounted on the member and in contact therewith when the member is inflated. The at least two supports extend generally transversely away from the member. A bracing cable is connected to the at least two supports. The cable is oriented generally parallel to the axis and held at a generally fixed distance from the member by the at least two supports.

In accordance with a further embodiment of the present disclosure, an externally braced inflatable structure is provided. In this embodiment, an elongated selectively inflatable beam member includes a longitudinal axis. At least two spaced inflatable support members are mounted to an exterior surface of the beam member and extend away therefrom. At least one bracing cable is connected between the at least two spaced support members. The at least one bracing cable is located at a generally constant distance from the longitudinal axis when the beam member and the at least two support members are inflated.

BRIEF DESCRIPTION OF THE DRAWINGS

FIG. 7 is a perspective view of a fifth embodiment of an inflatable structure according to the present disclosure.

FIG. 8 is a greatly enlarged perspective view of a portion of the inflatable structure of FIG. 7.

DETAILED DESCRIPTION

Figure 1:
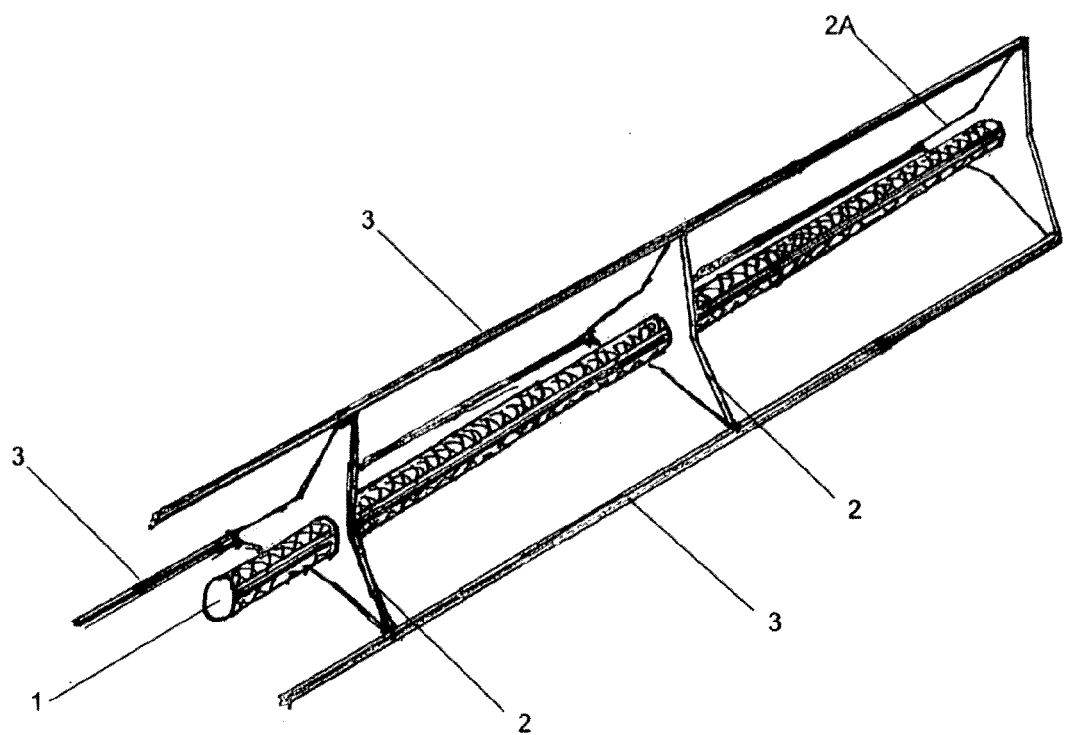
FIG. 1 shows an inflatable structure with three external tension cables according to a first embodiment of the present disclosure.
Figure 2:
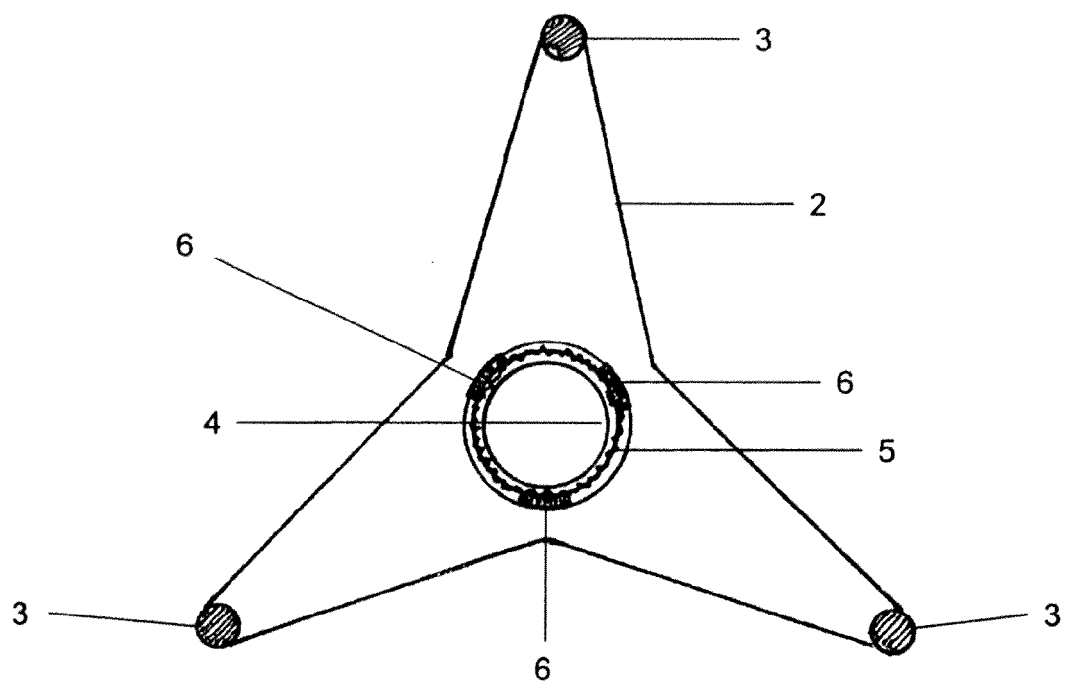
FIG. 2 shows a cross section of the inflatable structure of FIG. 1.

A truss-like structure is illustrated in FIG. 1 and in FIG. 2, a cross section. The inflatable beam, column, or member 1 comprises a bladder 4, a braided restraint layer 5 and one or more axial reinforcement straps 6. The bladder 4 holds inflation gas, but has no structural function. The braided restraint layer 5 retains the gas pressure and provides shear and torsion resistance. The axial reinforcement straps 6 govern the inflatable structure's bending strength and stiffness. Generally transversely extending supports such as frames 2 restrain and align the bracing cables 3 at a distance from, and parallel to, the central inflatable structure 1. The end supports or frames 2A provide tension to the bracing cables 3 at a distance from and parallel to the central inflatable structure 1.

The end supports or frames 2A provide tension to the bracing cables 3 by the action of the central inflatable structure 1 tending to elongate when pressurized. The axial reinforcement straps 6 are also tensioned by this action. A designer, by choosing materials with a particular elastic modulus, and by determining the amount of weight per unit length of each material, determines how much tension is carried in the bracing cables 3 compared to the tension carried in the axial reinforcement straps 6, and, thus, tailors the structural properties of the truss-like externally braced structure.

Variations of this embodiment include trusses and beams, similar structures with more than three external cables and optional diagonal cables extending between the generally transversely extending supports to increase shear and torsion stiffness and strength.

The various flexible elements of the truss example may be infused with a resin that is controllably hardened to create a permanently rigid structure that does not depend on the maintaining of the inflation pressure, as is known in the art. This may be advantageous for very large structures for use in space that can be initially stowed in a small volume for launch.

Figure 3:
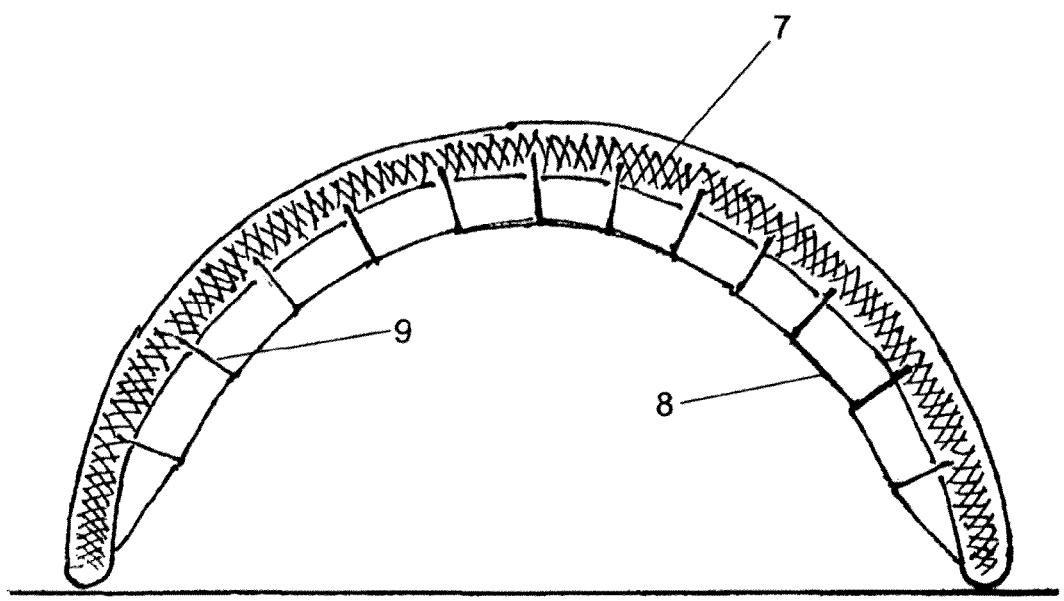
FIG. 3 shows an arch with an inside strengthening cable according to a second embodiment of the present disclosure.
Figure 4:
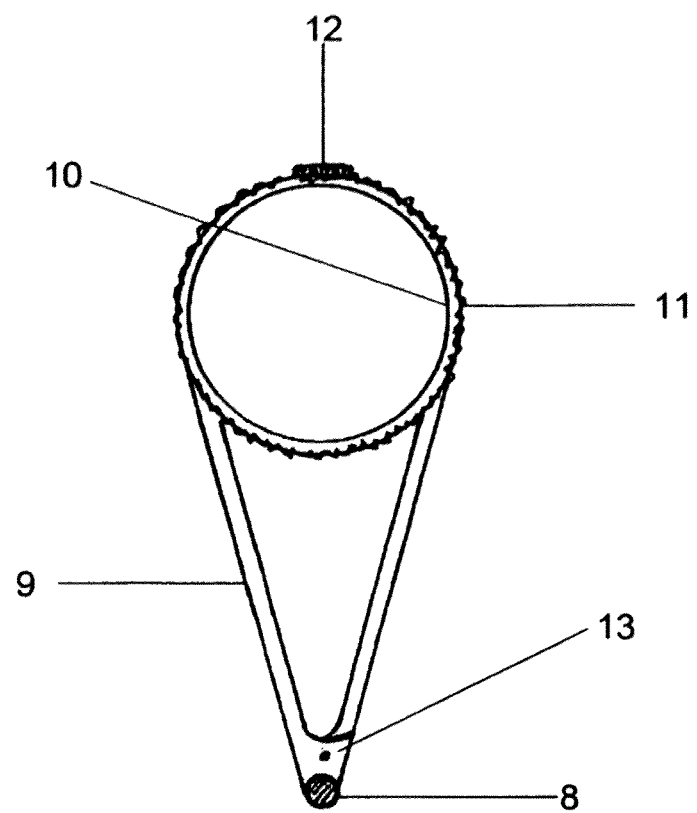
FIG. 4 shows a cross-section of FIG. 3.

An arched beam structure is illustrated in FIGS. 3 and 4. The inflatable component 7 is an inflatable beam comprising a gas-impermeable bladder 10, a braided restraint layer 11 and, in this embodiment, one axial reinforcement strap 12. The bladder 10 retains inflation gas, but has no structural function. The braided restraint layer 11 lends the structure the capability to retain high pressure, provides shear and torsion resistance, and can be curved during the manufacturing process without wrinkling. In this embodiment, transverse frames 9 restrain and align the bracing cable 8 at a distance from the central inflatable component 7. Pivots 13 can be provided as part of the transverse frames 9 to reduce the size of the transverse frames 9 when the arched beam structure is deflated and folded for storage.

Inflating the inflatable component causes the axial reinforcement strap 12 and the bracing cable 8 to be tensioned. Tension is provided to the axial reinforcement strap 12 and to the bracing cable 8 by the action of the central inflatable structure 7 that elongates and straightens when pressurized. Such action, which the designer controls by choice of the various materials, material weight per unit length, inflatable component 7 diameter, and the offset distance of the bracing cable 8 from the inflatable component 7, determines the strength and stiffness of the arched beam.

Compared to an un-braced inflatable structure, the arched beam of FIG. 3 will have increased strength for downward loads, and little or no advantage for upward loads. Therefore, it would be beneficial for supporting structures subject to high snow loads, or for buried shelters as may be needed for lunar habitation.

Variations of the arched beam of FIG. 3 include designs with multiple axial reinforcement straps 12 and/or multiple bracing cables for increasing strength in the direction perpendicular to the plane of the arch.

Figure 6:
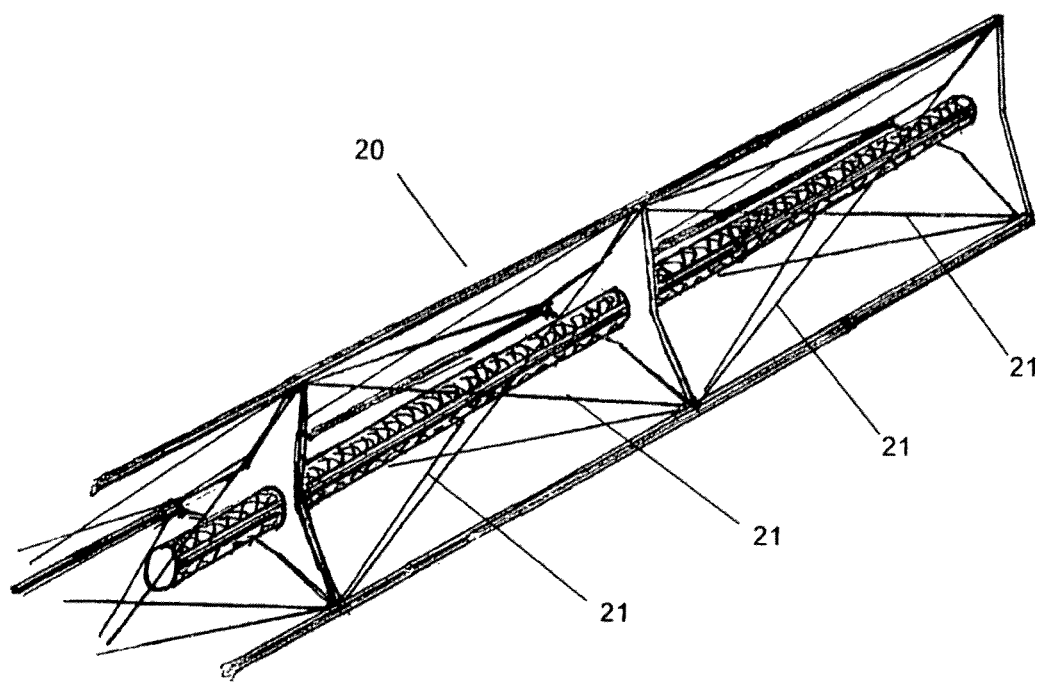
FIG. 6 shows the inflatable structure with diagonal cables according to a fourth embodiment of the present disclosure.

In FIG. 6 the structure of FIG. 1 (20) is reinforced with diagonal cables 21. Such diagonal cables enhance the structure when the shear stiffness of the inflated member is not sufficient.

Figure 5:
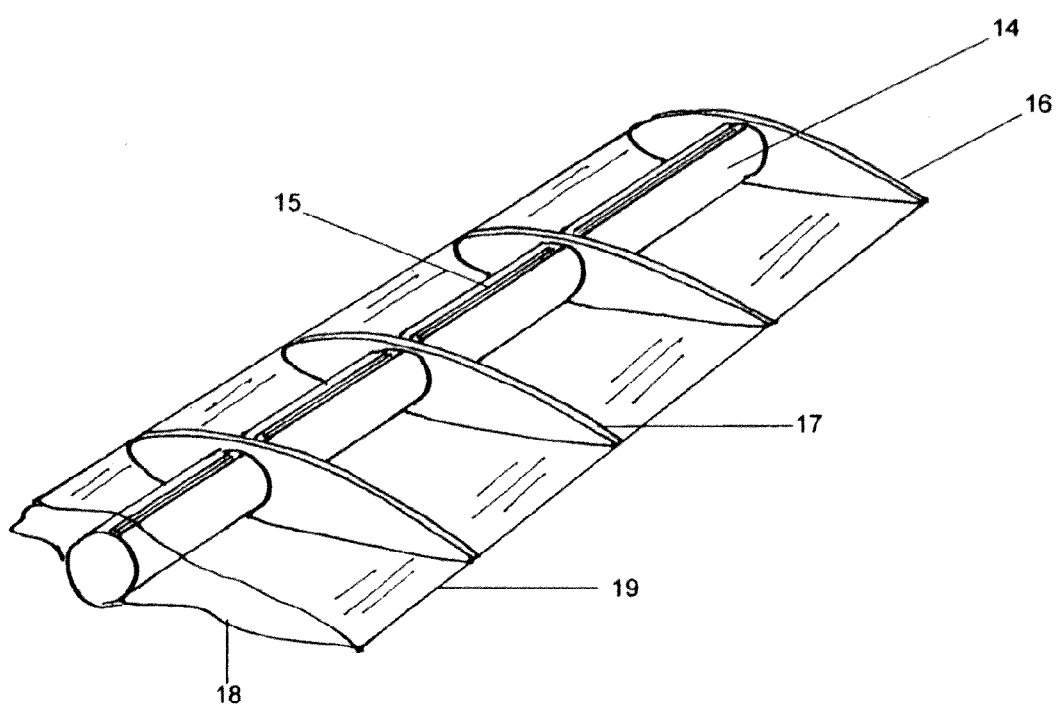
FIG. 5 shows an inflated wing according to a third embodiment of the present disclosure.

Another example of an externally braced inflatable structure is the membrane wing shown in FIG. 5. The inflatable spar 14 comprises a gas-impermeable bladder, a braided restraint layer, and axial reinforcement straps 15 as previously described. The wing skin membrane 18 encloses the spar 14 and ribs 17 and provides the aerodynamic surface of the wing. The membrane 18 is attached to the tip rib 16 such that the action of the inflatable spar tending to elongate when pressurized creates tension in the membrane. A chord 19, forming the trailing edge of the wing, is also tensioned by said action of the inflatable spar 14, "span-wise", which is necessary for controlling the aerodynamic shape of the membrane 18 between ribs 16 and 17.

In the wing example, the benefit of external bracing is not improved structural performance; it is the ability to control the distribution of tension into the wing skin membrane 18 for an aerodynamic benefit.

Variations of the inflatable wing example include additional inflatable elements to further improve membrane shape, the addition of cords or fibers to the membrane in order to tailor its modulus, and ribs that bend or have pivoting means in order to fold the wing flat for storage.

With reference now to FIG. 7, disclosed is an inflatable structure, column, beam or member 100 that similarly comprises a bladder, a braided restraint layer, and, optionally, axial reinforcement as in the embodiment of FIG. 1, for example. The bladder holds an inflation gas but has no structural function. The braided restraint layer retains the gas pressure and provides shear and torsion resistance to the structure or beam 100. The presence of the axial reinforcement straps regulates the structure's bending strength and stiffness. Disposed on the member, beam or column 100 are one or more supports 110. The supports can be spaced along an axial length of the member 100. In this embodiment, each support 110 can be defined as an inflatable torus or ring. The torus can be readily manufactured using the construction techniques which are taught in U.S. Pat. No. 5,421,128, the subject matter of which is incorporated hereinto by reference in its entirety. The several tori 110 are held in place along an axis of the member or column 100, such as by adhesives or other known means. In other words, the tori are bonded to the column 100. Connected to each torus 110 are a plurality of bracing cables 120. The bracing cables connect adjacent tori 110 to each other. The cables are, however, spaced from the centrally positioned member or column 100. Thus, the bracing cables are arranged in an orientation which is generally parallel to the longitudinal axis of the column 100 and are held at a generally fixed distance from the column by the respective tori 110. In one embodiment, there may be three or more bracing cables provided at equal distances around the periphery of each torus 110.

It can be seen that the structure can further comprise at least one diagonal cable 130 connecting at least two tori 110. The diagonally extending cables 130 serve to further connect the several tori 110 to each other and distribute forces along the periphery of the structure and between the tori.

In this embodiment, all components of the inflatable structure or truss are flexible. Such flexibility has the advantage of providing a smaller volume for a predeployment packaging of the reinforced inflatable structure. Thus, the packaging can be more efficient. Another advantage of this embodiment is the reduced probability of damage due to tight packing of rigid members as, for example, the frame 2 in the embodiment of FIG. 1, against delicate inflatable members. Further, in this embodiment, there is a reduced likelihood of snagging cables on rigid frames, while deploying the reinforced inflatable structure.

In one embodiment, the bracing cables 120 can be secured to an exterior periphery of the supports 110 via bands or straps, such as at 140. Such bands can extend around the outer circumference of each toroidal support 110. The bracing cables 120 can be stitched or tied to the band 140 via straps 142 as shown in FIG. 8. The bands 140 can be bonded to the support 110 via any conventional means, such as adhesive or the like.

The supports 110 can be inflated at generally the same time as the beam or column 100. In one embodiment, a known gas generator cartridge is mounted to each support 110 to inflate it. In another embodiment, a solid propellant could be placed inside each inflatable support 110 at the time of its manufacture. Initiation of the deployment would take place at the desired time, such as via a wireless command or the like. Other embodiments for inflating the supports 110 are also contemplated.

It should be recognized that the supports 110 are physically separate from the beam 100. In other words, the inflation gas which is used to inflate the beam 100 preferably does not flow into the supports 110. However, another possible way of inflating the supports 110 would be to provide hoses extending between the beam 100 and each support 110. This is not a preferred way of inflating the supports 110.

Disclosed has been the unique use of an inflatable element to provide tension to longitudinally extending cables, thus rendering them capable of resisting bending. However, the cables are not capable of resisting compression. The inflatable member performs that function. Thus, provided is a new combination of an inflatable element which provides pretension to cables in order to form a reinforced inflatable structure. By spacing the axial tension elements (the cables) away from the surface of the inflatable structure, i.e., the central beam or column, a limitation on the scale of the structure or size of the structure is eliminated. The resulting structure is particularly advantageous in outer space applications where stiffness rather than strength is critical.

The addition of the transverse supports on the exterior of the inflatable member overcomes the limitation of compression in a slender column by reducing the slenderness of the column to less than the critical value known through the Euler equation. This equation gives the maximum axial load that a long slender column can carry without buckling. The present disclosure pertains to the use of generally transversely oriented supports which can either be rigid or inflatable, to increase the effective diameter of the column and control the buckling of the central inflatable element. The central inflatable member serves to preload the bracing cables in order to form a reinforced inflatable structure.

The disclosed embodiments use external bracing tensioned by inflatable structures. The external tensile members are made of high modulus fibers and are spaced away from the central inflatable structure by generally transversely extending supports. The structure can be made rigid after deployment by unidirectional bundles of fibers to maximize compression performance after deployment. A truss can be made up of a central inflatable structure or member that is strengthened with external braces made of high modulus fibers spaced away from the central member by generally transversely oriented supports mounted on the central member.

A structural member arch can be strengthened by using a cable below the member and oriented generally parallel to it at some distance with spoke-like linear attachments holding the member shape under loads that would tend to collapse the arch. A deployable wing with an inflatable member spar that also relies on span-wise tension in the skin of the wing for maintenance of shape would operate under the same principle as the other externally braced inflatable structures of this disclosure.

The disclosure has been described with reference to several embodiments, obviously, modifications and alterations will occur to others upon a reading and understanding of this specification. It is intended to include all such modifications and alterations insofar as they come within the scope of the appended claims or the equivalents thereof.

The invention claimed is:

1. A reinforced inflatable structure comprising:
   an inflatable member including a longitudinal axis, the member comprising a bladder and a braided restraint layer mounted to the bladder;
   a plurality of spaced supports mounted on said member and extending outwardly therefrom; and
   a plurality of spaced bracing cables connected to a respective one of said plurality of supports, said cables being oriented generally parallel to said longitudinal axis and held at a generally fixed distance from said member by said supports, wherein the inflatable member tensions the bracing cables rendering them capable of resisting bending.

2. The structure of claim 1 in which there are three or more bracing cables spaced at equal distances from said member.

3. The structure of claim 1 in which said bracing cables are infused with a resin and wherein said cables are made rigid by a curing of said resin while said structure is inflated.

4. The structure of claim 1 in which said member is one of curved and straight.

5. The structure of claim 1 wherein said supports comprise inflatable bladders.

6. The structure of claim 1 that can be folded for transportation before it is inflated.

7. The structure of claim 1 further comprising at least one diagonal cable connected between an adjacent pair of said plurality of spaced supports.

8. The structure of claim 1 wherein the plurality of supports are axially spaced and extend along the longitudinal axis of the inflatable member.

9. An externally braced inflatable structure comprising:
   an elongated selectively inflatable member including a bladder, a braided layer and a longitudinal axis;
   at least two supports mounted on said member and in contact therewith when said member is inflated, said at least two supports extending generally transversely away from said member, and
   a bracing cable connected to said at least two supports, said cable being oriented generally parallel to said axis and held at a generally fixed distance from said member by said at least two supports.

10. The structure of claim 9 wherein a plurality of bracing cables are spaced at equal distances from said member.

11. The structure of claim 10 in which said bracing cables are infused with a resin and wherein said cables are made rigid by a curing of said resin while said structure is inflated.

12. The structure of claim 9 further comprising at least one diagonal cable connecting said at least two supports.

13. The structure of claim 9 wherein at least one of said at least two supports encircles said member.

14. The structure of claim 9 wherein at least one of said at least two supports is toroidal in shape.

15. An externally braced inflatable structure comprising:
   an elongated selectively inflatable beam member including a longitudinal axis;
   at least two spaced inflatable support members mounted to an exterior surface of said beam member and extending away therefrom;
   at least one bracing cable connected between said at least two spaced support members;
   wherein said at least one bracing cable is located at a generally constant distance from said longitudinal axis when said beam member and said at least two support members are inflated.

16. The structure of claim 15 further comprising a band encircling at least one of said at least two support members, said at least one bracing cable being connected to said band.

17. The structure of claim 16 further comprising a strap securing said at least one bracing cable to said band.

18. The structure of claim 15 wherein said at least two spaced support members encircle said inflatable member.

19. The structure of claim 15 further comprising at least one diagonal cable connecting said at least two support members.

20. The structure of claim 15 wherein said longitudinal axis is one of straight and curved.

* * * * *